United States Patent
Bedi et al.

(10) Patent No.: US 11,144,717 B2
(45) Date of Patent: Oct. 12, 2021

(54) AUTOMATIC GENERATION OF DOCUMENT LAYOUTS

(71) Applicant: Adobe Inc., San Jose, CA (US)

(72) Inventors: Amish Kumar Bedi, Punjab (IN); Sanyam Jain, Delhi (IN); Gaurav Bhargava, Uttar Pradesh (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/142,125

(22) Filed: Sep. 26, 2018

(65) Prior Publication Data
US 2020/0097536 A1 Mar. 26, 2020

(51) Int. Cl.
*G06F 40/186* (2020.01)
*G06F 40/106* (2020.01)

(52) U.S. Cl.
CPC .......... *G06F 40/186* (2020.01); *G06F 40/106* (2020.01)

(58) Field of Classification Search
CPC .............................. G06F 17/212; G06F 17/248
See application file for complete search history.

(56) References Cited

U.S. PATENT DOCUMENTS

| | | | |
|---|---|---|---|
| 7,917,518 B2* | 3/2011 | Obrador | G06F 16/5838 707/748 |
| 8,352,856 B2* | 1/2013 | Fillion | G06F 40/131 715/243 |
| 9,996,566 B2* | 6/2018 | Ben-Aharon | G06F 40/14 |
| 10,073,923 B2* | 9/2018 | Koren | G06F 16/9535 |
| 2004/0019851 A1* | 1/2004 | Purvis | G06Q 10/043 715/253 |
| 2004/0025109 A1* | 2/2004 | Harrington | G06Q 10/04 715/255 |

(Continued)

OTHER PUBLICATIONS

Xianjun Sam Zheng, "Correlating low-level image statistics with users-rapid aesthetic and affective judgments of web pages", International Conference on Human factors in Computing Systems (SIGCHI), Apr. 2009, ACM 978-1-60558-246—Jul. 8, 2004, 10 pages (Year: 2009).*

(Continued)

*Primary Examiner* — Scott T Baderman
*Assistant Examiner* — Benjamin Smith
(74) *Attorney, Agent, or Firm* — Kilpatrick Townsend & Stockton LLP

(57) ABSTRACT

Disclosed systems and methods for the automatic creation of multiple layouts that maintain a design aesthetic of an input design document. In an example, a document processing application determines a set of document layout parameters such as balance or equilibrium from an input document. The application calculates, for each document layout parameter of the input document, a weight representing a prominence of the respective layout parameter. The application selects templates having an output size and a number of object containers equal to the number of objects of the document. The application further calculates a score for each template by applying the weights of the document layout parameters to the template layout parameters. The application further selects a template with a highest score and places the object on the template, thereby creating the new design document that maintains the design aesthetic.

17 Claims, 7 Drawing Sheets

(56) References Cited

U.S. PATENT DOCUMENTS

| | | | | |
|---|---|---|---|---|
| 2005/0028074 A1* | 2/2005 | Harrington | | G06F 17/211 715/234 |
| 2005/0102628 A1* | 5/2005 | Salesin | | G06F 40/106 715/764 |
| 2006/0150092 A1* | 7/2006 | Atkins | | G06T 11/60 715/251 |
| 2006/0155699 A1* | 7/2006 | Purvis | | G06Q 10/10 |
| 2006/0200759 A1* | 9/2006 | Agrawala | | G06F 40/103 715/209 |
| 2007/0006072 A1* | 1/2007 | Purvis | | G06F 40/103 715/249 |
| 2007/0074109 A1* | 3/2007 | Nagahara | | G06F 40/103 715/210 |
| 2007/0133842 A1* | 6/2007 | Harrington | | G06K 9/00463 382/112 |
| 2007/0180363 A1* | 8/2007 | Dance | | G06F 40/106 715/210 |
| 2007/0208996 A1* | 9/2007 | Berkner | | G06F 40/106 715/210 |
| 2009/0002764 A1* | 1/2009 | Atkins | | G06T 11/60 358/1.18 |
| 2009/0024580 A1* | 1/2009 | Obrador | | G06F 16/5838 |
| 2009/0276695 A1* | 11/2009 | Hodges | | G06F 40/151 715/249 |
| 2010/0275152 A1* | 10/2010 | Atkins | | G06F 40/106 715/788 |
| 2011/0113323 A1* | 5/2011 | Fillion | | G06F 40/103 715/252 |
| 2013/0124981 A1* | 5/2013 | Chao | | G06F 40/103 715/243 |
| 2015/0310124 A1* | 10/2015 | Ben-Aharon | | G06F 17/212 715/205 |
| 2016/0371312 A1* | 12/2016 | Ben-Aharon | | G06F 17/212 |
| 2017/0344656 A1* | 11/2017 | Koren | | G06F 16/958 |
| 2017/0357717 A1* | 12/2017 | Hughes | | G06F 16/35 |
| 2018/0150436 A2* | 5/2018 | Ben-Aharon | | G06F 40/186 |
| 2018/0150446 A1* | 5/2018 | Sivaji | | G06F 3/04845 |
| 2018/0373799 A1* | 12/2018 | Koren | | G06F 3/0484 |
| 2020/0257759 A1* | 8/2020 | Ptaszynski | | H04L 41/22 |

OTHER PUBLICATIONS

Ngo, David Chek Ling, et al., "Evaluating Interface Esthetics", Springer Link, Knowledge and Information Systems, vol. 4, Issue 1, Jan. 2002, 34 pages.

* cited by examiner

AUTOMATIC GENERATION OF DOCUMENT LAYOUTS

TECHNICAL FIELD

This disclosure relates generally to document processing. More specifically, but not by way of limitation, this disclosure relates to automatic creation of additional document layouts that maintain a design aesthetic of an input design document.

BACKGROUND

Working on a graphic design project often involves creating multiple layouts from a single piece of artwork such as an image or document. For example, a designer could create different layouts of the artwork for different parts of a webpage or for different screen sizes. The different layouts may contain similar—but not necessarily identical—objects and text. For example, a designer uses a graphic illustration application to create a first artwork for online material. The designer then creates a second artwork by changing the artwork slightly for another location on the web page, while maintaining a particular design aesthetic or look-and-feel of the first artwork. The two artworks can be organized in a different manners or scaled differently, for example.

Existing solutions for automatically creating multiple layouts from a single artwork or document use constraint-based approaches. But such approaches are either unable to maintain a design aesthetic of the original artwork or only function when the positioning of the objects in the artwork remains the same.

Accordingly, solutions are needed for the automatic creation of multiple layouts of a document.

SUMMARY

Systems and methods are disclosed herein for the automatic creation of multiple layouts that maintain a design aesthetic of an input design document. In an example, a computer-executed method accesses a document and an output size for generating a new design document, the document including an object comprising visual content. The method further determines, from the document, a set of document layout parameters. The method further calculates, for each document layout parameter, a weight representing a prominence of the respective layout parameter. The method further selects, from a predefined list of templates, a set of templates, each having an output size and a number of object containers equal to the number of objects of the document, wherein each of the templates includes a set of template layout parameters. The method further calculates, for each of the templates, a score by applying the weights of the document layout parameters to the template layout parameters. The method further selects a template with a highest score from the templates. The method further places the object on the template, thereby creating the new design document.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

DETAILED DESCRIPTION

Figure 1:
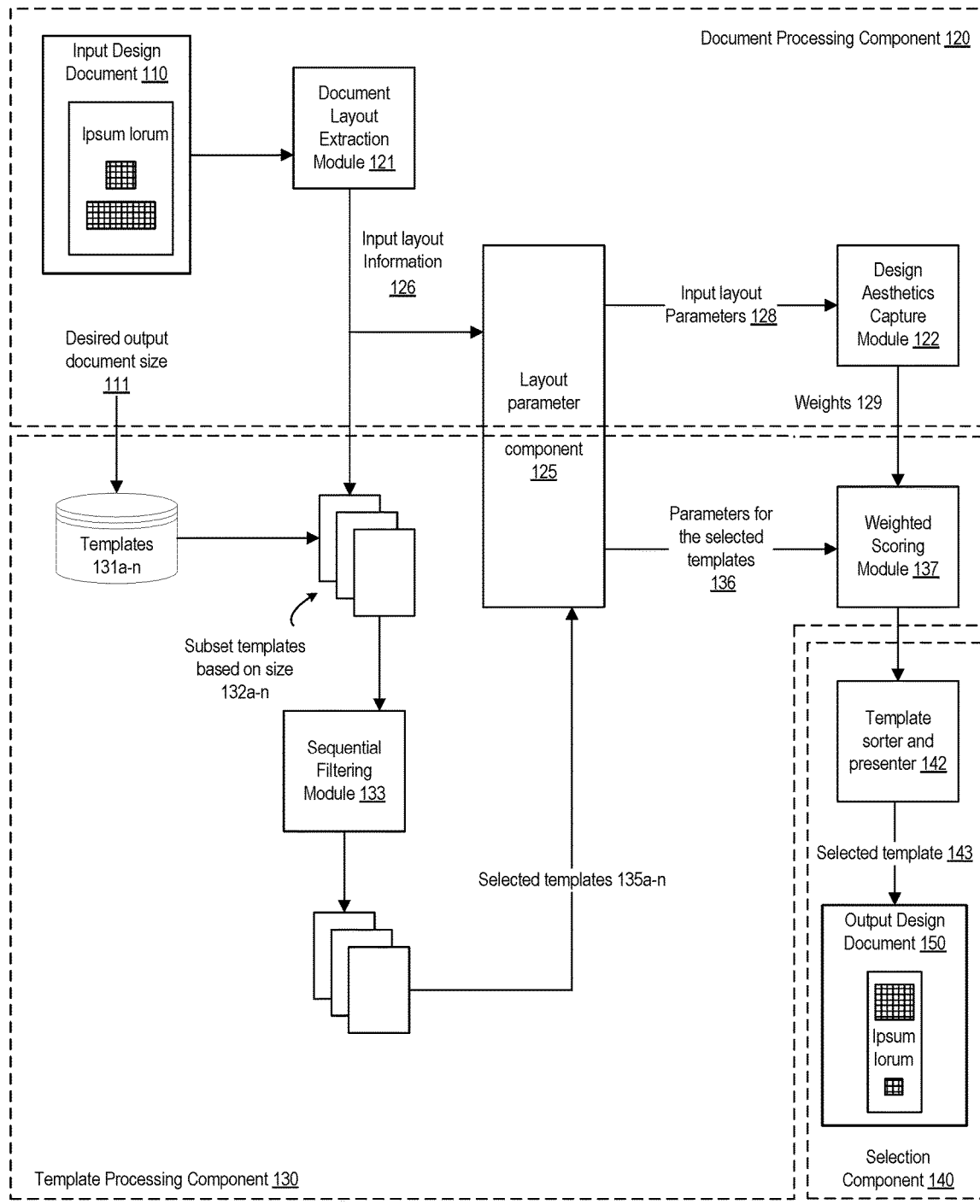
FIG. 1 is a diagram depicting an example of application components used for creating an additional layout of a document, according to an embodiment of the present disclosure.

System and methods described herein efficiently and effectively create documents with additional layouts from an input design document while maintaining a design aesthetic of the input design document. Different document layouts include variations in size or placement of objects within the document.

More specifically, certain embodiments model a design aesthetic of the input document by determining a set of layout parameters such as balance, density, and equilibrium and a corresponding set of weights that represent a relative prominence of each parameter. Certain embodiments use the determined weights to select a template that may differ from the input design document in size, shape, or in other respects, but maintains the input design aesthetics. Objects from the input design document are propagated to the template, thereby creating a document with an additional layout.

As disclosed herein, "design document" refers to an electronic representation of text, images, user interface elements, and the like. Examples of documents include Adobe® InDesign® documents, vector based documents, text-based documents, banners used for advertisements, and web-based technologies such as Flash® or Shockwave®. A document can include one or more objects. Each object can have one or more properties such as a container or content that is stored within the object, such as text, an image, or a video.

As disclosed herein, "object" refers to a discrete component of a document. Example objects include images, text boxes, background objects, call-to-actions, descriptions, headings, heroes, logos, or sub-headings. Objects can be independently analyzed, removed from a document, or propagated to another document.

As disclosed herein, "template" refers to a reference document that can be used as a basis for creating an additional layout of an input design document. A template has a particular size and can include objects of various types. As explained further herein, a set of layout parameters that characterize a design aesthetic can be derived for a template.

The following non-limiting example is provided to introduce certain embodiments. In an example, a designer uses a document processing application to create an input design document that includes two objects: a foreground object and a text object. The document processing application includes a document processing component, a template processing component, and a selection component.

The document processing component captures a design aesthetic of the input document by determining a set of document layout parameters such as balance or density. The document processing component then determines a weight for each parameter based on a relative prominence of the respective parameter. For example, a high degree of balance and a small degree of density results in a higher weight for balance and a lower weight for density.

The template processing component receives a desired input size and metadata about the input document such as the objects, their types, and their locations within the document. The template processing component accesses a set of document templates and selects a subset of document templates that have a desired output size and include one foreground object and one text object. Subsequently, the template processing application applies the weights determined from the input design document to the layout parameters of each template, thereby determining a score that represents a relative match between a design aesthetic of the template and the design aesthetic of the input design document.

The selection component either selects the best match template by choosing the template with the highest score or provides the designer with several possible high-scoring templates. The selection component places the objects in the selected template, thereby creating a new design document that maintains the original design aesthetic.

As discussed above, existing techniques for creating documents with additional layouts either require manual intervention or fail to maintain the design aesthetic of an input design document. In some cases, such constraint-based approaches are unable to capture a design aesthetic of an input document. In contrast, by determining a set of layout parameters such as balance, density, and equilibrium and a corresponding set of weights that represent a relative prominence of each parameter, certain embodiments capture a design aesthetic of the input document. The captured design aesthetic can then be used to determine one or more appropriate document templates of different size or shape that maintain the design aesthetic. In overcoming deficiencies of previous solutions, certain embodiments automate a workflow for a designer responsible for creating multiple document layouts to meet requirements such as different web pages, print media, or screen sizes.

FIG. 1 is a diagram depicting an example of application components used for creating an additional layout of a document, according to an embodiment of the present disclosure. FIG. 1 depicts document processing system 100, which includes document processing component 120, template processing component 130, and selection component 140. Document processing system 100 receives input design document 110 and determines an output design document 150 that maintains a design aesthetic of input design document 110.

FIG. 1 depicts an exemplary distribution of tasks between components 120, 130, and 150. However, functionality described herein can be divided between any number of different components. Each of components 120, 130, and 150 can be implemented on one or more computing devices such as the computing device described with respect to FIG. 7.

Document processing component 120 analyzes input design document 110 and determines a set of layout scores that capture the design aesthetics of input design document 110. Input design document 110 includes one or more objects such as foreground objects, background objects, and text boxes. An example input design document is discussed further with respect to FIG. 2. Document layout extraction module 121 extracts input layout information 126 from input design document 110. Objects on input design document 110 can be tagged, or identified, as objects of a certain type. Input layout information 126 includes objects, type of objects, their positions in the document, etc.

Based on the objects, their sizes, and their placement within input design document 110, layout parameter component 125 calculates a set of input layout parameters 128, which can include parameters such as balance or density. Layout parameter component 125 is shared between document processing component 120 and template processing component 130. As discussed further with respect to FIG. 3, design layout parameters can include balance, density, and equilibrium. While a parameter-based approach to characterizing a layout of a document or template is described herein, other approaches can be used.

Design aesthetics capture module 122 receives the input layout parameters 128 and determines a set of weights 129. Weights 129 are determined based on a relative prominence of the respective parameter. For example, a high degree of balance and a small degree of density results in a higher weight for balance and a lower weight for density. Together, the weights 129 capture the design aesthetics of input design document 110.

Template processing component 130 selects one or more templates from templates 131a-n that each maintain the design aesthetic of input document 110 as determined by document processing component 120. Template processing component 130 includes sequential filtering module 133, scores for selected templates 136, and weighted scoring module 137. In an example, template processing component 130 accesses a desired output document size 111 and templates 131a-n and determines a size-filtered templates 132a-n that are of a size consistent with output document size 111. Sequential filtering module 133 filters the subset of templates 132a-n based on additional criteria such as number and type of elements, or area ordering, thereby creating selected templates 135a-n.

Template processing component 130 provides selected templates 135a-n to layout parameter component 125, which obtains a set of parameters for the selected templates 136 such as balance, equilibrium, or density. Template processing component 130 provides the set of parameters for the selected templates 136 to weighted scoring module 137. Weighted scoring module 137 receives weights 129 from design aesthetics capture module 122 and applies the weights 129 to the parameters 128. In this manner, template processing component 130 determines which templates best propagate the design aesthetic of the input design document 110.

Selection component 140 includes template sorter and presenter 142 which receives the templates scored by weighted scoring module 137. In an embodiment, template sorter and presenter 142 presents a user a selection or a visualization of the templates so that the user may select a preferred template. In another embodiment, the selection component 140 selects the template that has the highest score, i.e., is the best match for the design aesthetic of input design document 110. Selection component 140 applies the objects from input design document 110 to the selected template, thereby creating output design document 150.

Figure 2:
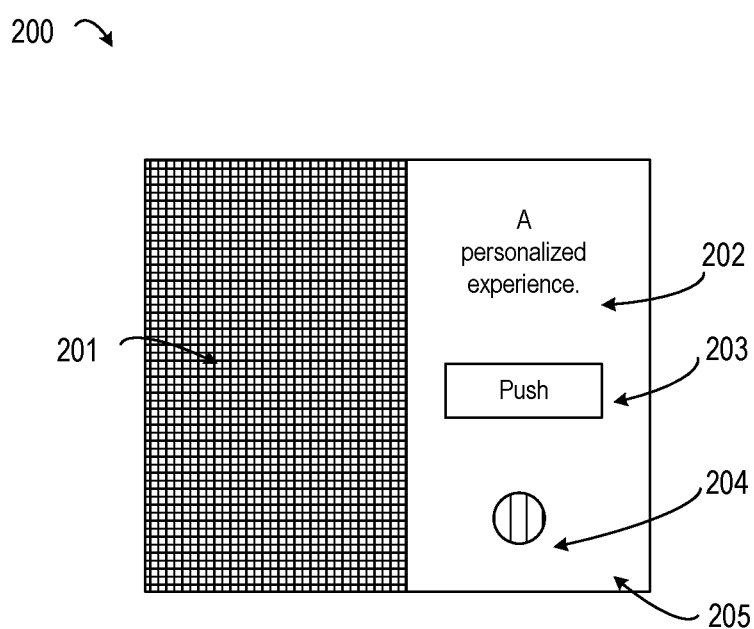
FIG. 2 is a diagram depicting an example of an input design document, according to an embodiment of the disclosure.

FIG. 2 is a diagram depicting an example of an input design document, according to an embodiment of the disclosure. FIG. 2 depicts input design document 200, which includes objects 201-204 and background 205. Input design document 200 is an example of input design document 110.

Input design document 200 can include one or more objects of different types. Example types include foreground objects, background objects, graphics, text, user interface elements, etc. As depicted, object 201 is a rectangular shaped image, object 202 is a text box containing the text "A personalized experience." Object 203 is a button labeled "push" and object 204 is a circular shaped image. As further described with respect to FIGS. 3 and 4, document processing component 120 analyzes input design document 200, including the number of objects, types of objects, and location of objects within input design document 200. From the analysis, document processing application determines a set of document layout parameters that capture the design aesthetic of input design document 200. Examples of objects are container boxes having content types images, audio, video, vectors. Example container boxes include rectangles, circles, ellipses, hexagons, other polygons, and other shapes such as a Bezier shape. Such container boxes can be further categorized as background images, hero images, call-to-actions (hyperlink or button), descriptions, headings, logos, etc.

Figure 3:
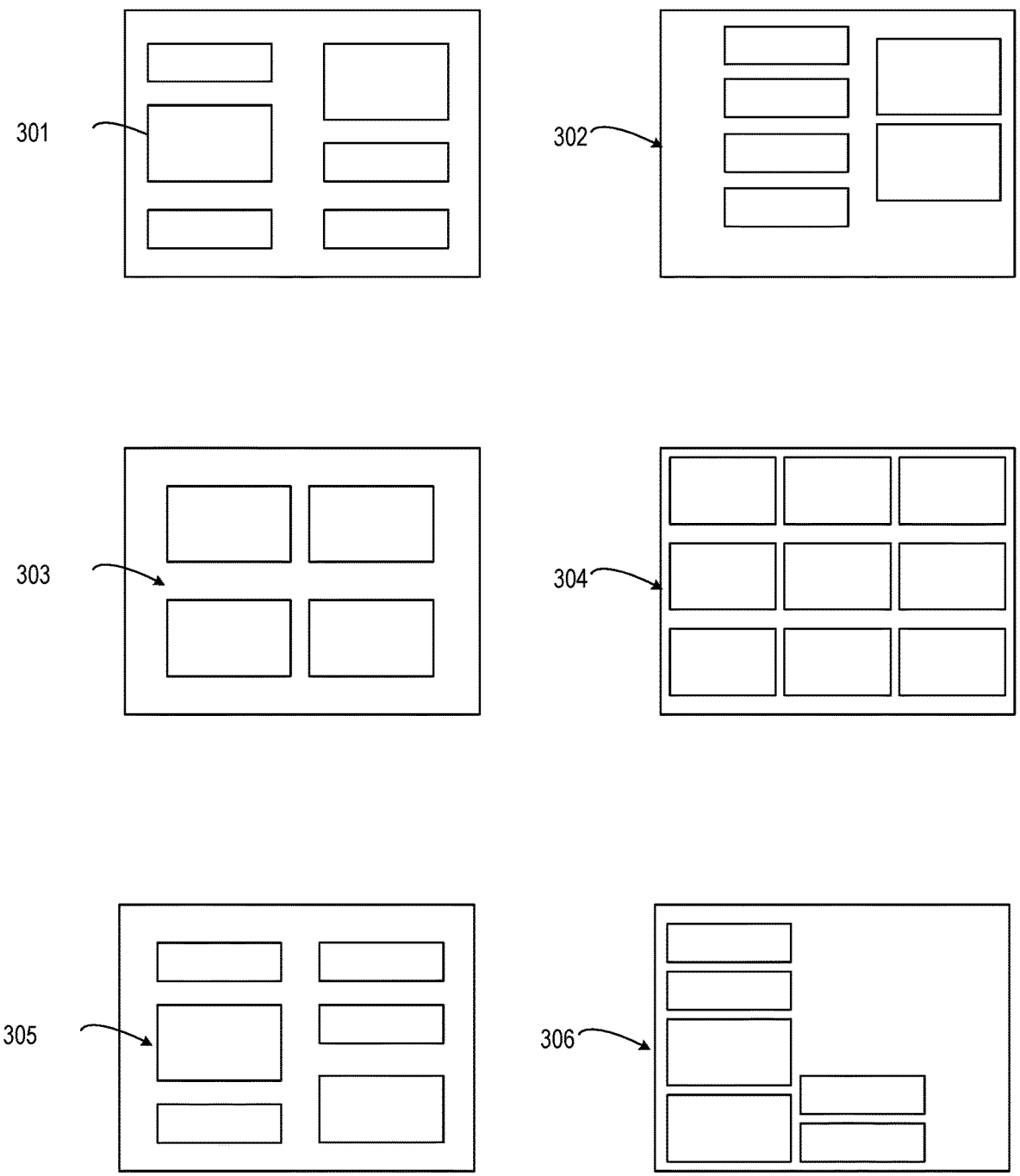
FIG. 3 is a diagram depicting examples of layouts that have different parameter configurations, according to an embodiment of the disclosure.

FIG. 3 is a diagram depicting examples of documents with layouts that have different parameter configurations, according to an embodiment of the disclosure. FIG. 3 depicts exemplary documents 301-306 that help illustrate the manner in which objects present in an input design document are analyzed to determine layout parameters such as balance, density, and equilibrium for the design document. As discussed herein, the layout for an input design document or a template is analyzed to determine the different layout parameters associated with the input design document, such as balance, density and equilibrium. For example, the templates discussed with respect to FIG. 4 can be characterized according to the layout parameters as discussed with respect to FIG. 3.

Balance is a measure of a distribution of optical weights in a layout. Optical weights may refer to how prominent an object may be visually perceived by a person viewing a visual representation of the document. Larger objects are more visually prominent, whereas small objects are less visually prominent. A high balance score is obtained by providing an equal weight of objects, left and right, top and bottom. More specifically, balance can be computed as the difference between total weighting of objects on each side of a horizontal and a vertical axis of a document. The horizontal and vertical axes are relative to to a (0,0) point in the middle of the document. Balance can be given by:

$$BM = \frac{|BM_{vertical}| - |BM_{horizontal}|}{2},$$

where $BM_{vertical}$ and $BM_{horizontal}$ are, respectively the vertical and horizontal balances and are calculated:

$$BM_{vertical} = \frac{w_L - w_R}{\max(|w_L|, |w_R|)}$$

$$BM_{horizontal} = \frac{w_T - w_B}{\max(|w_T|, |w_B|)}$$

where $w_j = \sum_i^n a_{ij} d_{ij}$ and j=L, T, R, B, where L, R, T, and B stand for left, right, top, and bottom, respectively; $w_j$ is the total weight of side j; $a_{ij}$ is the area of object i on side j; $d_{ij}$ is the distance between the central lines of the object and the edges of the layout; and $n_j$ is the total number of objects on the side.

Documents 301 and 302 illustrate different levels of balance. More specifically, document 301 is an example of a document that has a relatively high balance parameter. As depicted, document 301 shows two columns of objects. Each column is equally spaced from the left and right and equally spaced from the top and bottom of the document. In contrast, document 302 illustrates a low balance parameter. Document 302 includes two columns depicted in document 302 are located closer to the right than to the left.

Density refers to the extent to which a layout is covered by objects. In an example, density can be calculated using the following equation:

$$DM = 1 - 2\left|0.5 - \frac{\sum_i^n a_i}{a_{frame}}\right|,$$

where $a_i$ and $a_{frame}$ are the areas of object i and the edges of the layout; and n is the number of objects on the layout. As depicted, documents 303 and 304 each include four objects, but the objects in document 303 occupy less of the total area of the document than the objects in document 304. Therefore, document 303 has a lower density than document 304.

Equilibrium refers to a measure of stabilization of objects with respect to a midway center of suspension. Equilibrium on a document is accomplished through centering the document itself. Equilibrium can be computed as the difference between the center of mass of the displayed elements and the center of suspension of the document. Equilibrium can be measured by:

$$EM = 1 - \frac{|EM_x| + |EM_y|}{2}$$

where the equilibrium components along the x-axis (EMx) and y-axis (EMy) are given by:

$$EM_x = \frac{2\sum_n^i a(x_i - x_c)}{b_{frame} \sum_n^i a_i} \text{ and}$$

$$EM_y = \frac{2\sum_n^i a(y_i - y_c)}{h_{frame} \sum_n^i a_i}$$

where $(x_i; y_i)$ and $(x_c; y_c)$ are the coordinates of the centers of object i and the layout; $a_i$ is the area of the object; $b_{frame}$ and $h_{frame}$ are the width and height of the layout; and n is the number of objects on the layout.

As depicted, layout 305 shows objects that are equally spaced around the midpoint of the layout, whereas layout 306 shows objects that are clustered towards the bottom left of the layout. Therefore, layout 305 has a higher equilibrium score than layout 306.

Other possible parameters include symmetry, sequence, cohesion, unity, proportion, simplicity, regularity, economy, homogeneity, and rhythm. These and other measurements can be quantified and used by document processing component 120 to model a design aesthetic of an input design document and by template processing component 130 to identify relevant templates that have similar or identical aesthetics.

For example, symmetry is the extent to which the screen is symmetrical in three directions: vertical, horizontal, and diagonal. Symmetry is axial duplication: a unit on one side of a center line can be replicated on the other side. Vertical symmetry refers to the balanced arrangement of equivalent elements about a vertical axis, and horizontal symmetry about a horizontal axis. Radial symmetry is equivalent elements balanced about two or more axes that intersect at a central point. Sequence in design refers to the arrangement of objects in a layout in a way that facilitates the movement of the eye through the information displayed. Cohesion is a measure of the embodiment ratios of the objects compared to the embodiment ratios of the layout. Unity is coherence, a totality of elements that is visually all one piece. With unity, the elements seem to belong together, to dovetail so completely that they are seen as one thing. Unity in screen design is achieved by using similar sizes and leaving less space between elements of a screen than the space left at the margins. Proportion is the comparative relationship between the dimensions of the screen components and proportional shapes. Simplicity is directness and singleness of form, a combination of elements that results in ease in comprehending the meaning of a pattern. Regularity is a uniformity of elements based on some principle or plan. Regularity in screen design is achieved by establishing standard and consistently spaced horizontal and vertical alignment points for screen elements, and minimizing the alignment points. Economy is the careful and discreet use of display elements to get the message across as simply as possible. Economy is achieved by using as few sizes as possible. The relative degree of homogeneity of a composition is determined by how evenly the objects are distributed among the four quadrants of the screen. Rhythm in design refers to regular patterns of changes in the elements.

Figure 4:
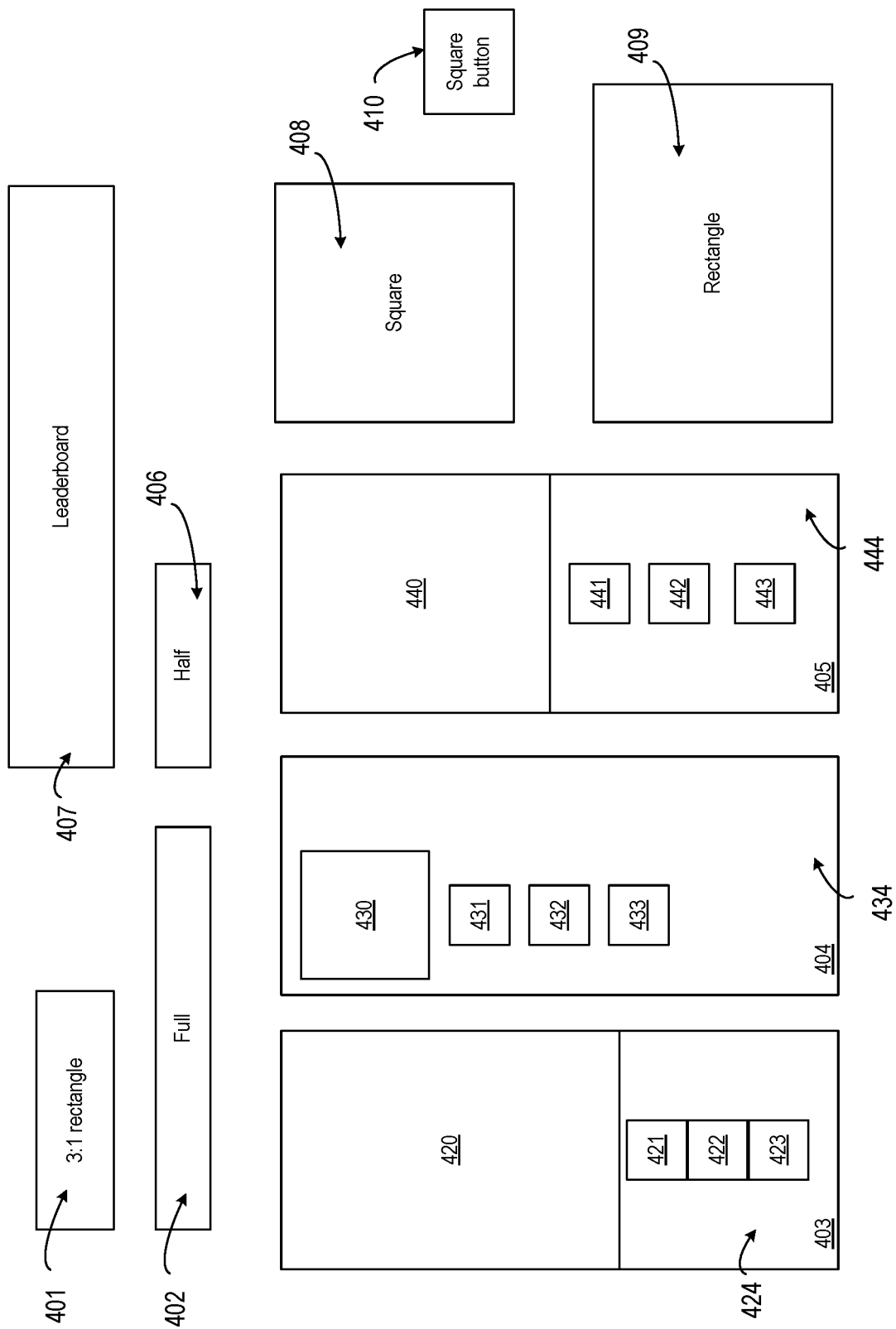
FIG. 4 depicts examples of templates, according to an embodiment of the present disclosure.

FIG. 4 depicts examples of templates, according to an embodiment of the present disclosure. FIG. 4 depicts exemplary templates 401-410. Templates 401-410 are examples of templates 131a-n. Different sizes of templates, shapes of templates, templates with different number of objects and types of objects, and templates with different layout parameter values (balance, equilibrium, or density) are possible. Examples of templates 401-410 include designer-preferred templates or standardized templates such as standard banner advertisement templates. A designer may select a template from template 401-410 or select a subset of these templates, i.e., a subset that has been filtered by size and/or design aesthetic as further described herein.

As depicted, templates 401-407 and 409 are rectangular, whereas templates 408 and 410 are square. Other shapes are possible. Different size templates are also possible. Template 401 is a rectangle with a 3:1 ratio of width to height, whereas template 405 is tall and thin, for example. Table 1 illustrates examples of template sizes, but other sizes are possible. Document processing component 120 receives a desired template size form a user, for example, via a user interface element, and selects a desired template with size that equals or is within a threshold of the desired size.

In an embodiment, template processing component 130 can create or modify templates based on user feedback. For example, template processing component 130 presents a user with an example template and the user further modifies the template, then template processing component 130 can save the modified template in the set of templates for future use.

Templates can be designed to confirm to industry standard sizes (e.g., letter, A4, standard banner, leaderboard, iPhone® screen, etc.) and/or designed according to a particular design philosophy (e.g., an image should occupy a certain percentage of the total area). In an embodiment, template processing component 130 can automatically generate or reconfigure a set of templates based on design constraints.

TABLE 1

| Name | Size (pixels) |
| --- | --- |
| Square | 250 × 250 |
| Small Square | 200 × 200 |
| Banner | 468 × 60 |
| Leaderboard | 728 × 90 |
| Medium Rectangle | 300 × 250 |
| Large Rectangle | 336 × 280 |
| Skyscraper | 120 × 600 |
| Wide Skyscraper | 131 × 600 |
| Half-Page Ad | 300 × 600 |
| Large Leaderboard | 970 × 90 |
| Large Mobile Banner | 320 × 100 |
| Mobile Leaderboard | 320 × 50 |

As depicted, templates 403-405 depict identically-sized rectangular documents and each include five objects. Template 403 includes template objects 440-443 placed vertically inside the layout and centered, and background object 424. Template 404 includes object 430 that occupies more than half of the layout, and objects 431-433 placed vertically inside the layout but clustered towards the top left of the layout, and background object 434. Template 405 includes template objects 440-443 placed vertically inside the layout and centered, and background object 444.

Templates 403-405 each differ with respect to balance, equilibrium, and density. In an example, using a scale from 1-10, template processing component 130 determines that layout 403 has a balance of 1, equilibrium of 1, and density of 1; layout 404 has a balance of 1, equilibrium of 5, and density of 10; and layout 405 has a balance of 10, equilibrium of 10, and density of 5.

Figure 5:
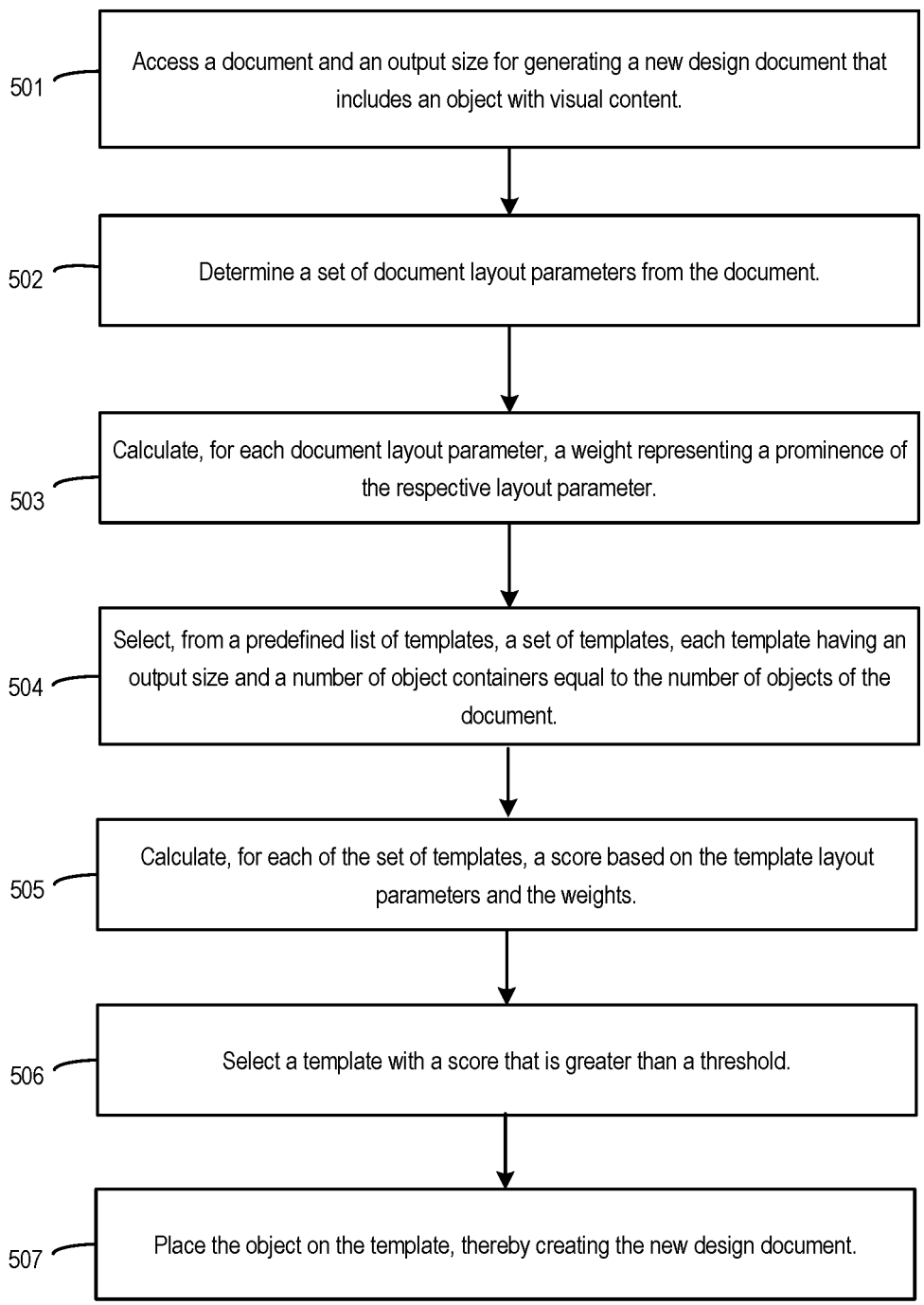
FIG. 5 depicts an example of a method for creating an additional layout of a document, according to an embodiment of the present disclosure.

FIG. 5 depicts an example of a method 500 for creating an additional layout of a document, according to an embodiment of the present disclosure. For example purposes only, method 500 is discussed with respect to document processing system 100 depicted in FIG. 1 and components thereof, input design document 200 depicted in FIG. 2, parameters discussed with respect to FIG. 3, templates as discussed with respect to FIG. 4, and example output discussed with respect to FIG. 6. Method 500 can be implemented by document processing component 120, template processing component 130, or selection component 140.

At block 501, method 500 involves accessing a document and an output size for generating a new design document that includes an object with visual content. For example, document processing component 120 accesses input design document 200 and a desired output size and shape for output design document 150, e.g., from a user interface element.

Document processing component 120 extracts layout information the input design document 200. This information is used to evaluate the document based on various design layout parameters as discussed with respect to FIG. 3. This extracted information includes information about the layout such as number of objects, object types, and the size of the layout. Document processing component 120 uses this information to determine an appropriate templates.

At block 502, method 500 involves determining a set of document layout parameters from the document. Document processing component 120 determines a set of document layout parameters for input design document 200. For example, document processing component 120 calculates a parameter value for each of balance, density, and equilibrium as discussed with respect to FIG. 3.

In an example, document processing component 120 analyzes input document 200. Document processing component 120 determines that objects 201-204 are placed within input document 200 in such a manner as to have a balance parameter of 10, an equilibrium parameter of 10, and a density parameter of 5, using a numerical scale of 1-10 are used. (Other scales are possible).

At block 503, method 500 involves calculating, for each document layout parameter, a weight representing a prominence of the respective layout parameter. In an example, weights $w_{BM}$, $w_{DM}$, and $w_{EM}$ can be calculated by:

$$w_i = \frac{P_i}{\sum_{j=1}^{n} P_j}$$

where $w_i$ is a particular weight, and $P_i$ is a value of a parameter.

Continuing the example, document processing component 120 calculates, for input document 200, a balance weight of 10/25=0.4, an equilibrium weight of 10/25=0.4, and a density weight of 5/25=0.2.

At block 504, method 500 involves selecting, from a predefined list of templates, a set of templates, each template having an output size and a number of object containers equal to the number of objects of the document.

In an embodiment, template processing component 130 may not find a matching template from templates 401-410 for the desired size constraint. In an embodiment, template processing component 130 can instead return a set of templates that are within a threshold range of the size, e.g., within 10%. In another embodiment, template processing component 130 can inform the user that no such template is available and cease executing pending further user input.

In a further embodiment, template processing component 130 can match based on a number of elements. In this case, template processing component 130 uses the number of elements determined from the input design document 200 to match against possible templates 401-410. The probable candidates which do not match in the number of elements are dropped. Additionally, template processing component 130 can match based on type of elements in the templates. Probable candidates that do not match on these types determined from input layout are dropped. Further, template processing component 130 can match based on area ordering. Area ordering is determined by a proportion of the object area compared to the total layout size. For example, template processing component 130 determines that the object with the highest proportion of area is of a background type, the second highest is a user-interface element, and the third highest is a heading. Template processing component 130 will not match a template that has area-ranking background type, heading, and user-interface element.

Continuing the example, template processing component 130 determines from templates 401-410 that templates 403, 404, and 405 match the size constraint received from a user in block 501 and continues to block 505 with templates 403, 404, and 405.

At block 505, method 500 involves calculating, for each of the set of templates, a score based on the template layout parameters and the weights. For example, template processing component 130 can apply each of the weights of the document layout parameters to the corresponding template layout parameter. For example, a balance weight from the input document is applied to the balance template layout parameter and the equilibrium weight from the input document is applied to the equilibrium layout parameter, and so on. In this manner, template processing component 130 determines the template that best matches the design aesthetic of input design document 200.

In an example, a score is calculated using the following equation:

$$S = w_{BM}BM + w_{DM}DM + w_{EM}EM$$

where $w_{BM}$, $w_{DM}$, and $w_{EM}$ are the weights of the input design document 200 for balance, density, and equilibrium respectively, and BM, DM, and EM respectively are the parameter values for a prospective template.

Continuing the example, template processing component determines scores of 16, 3, and 25 by applying the weights of input design document 200 to templates 403, 404, and 405.

At block 506, method 500 involves selecting a template with a score that is greater than a threshold. In some cases, selection component 140 can select the highest scoring template from the set of templates, but other scoring methods are possible.

Continuing the example, selection component 140 determines that template 405 has the highest score and is therefore the best match to the design aesthetic of input design document 200. In an embodiment, selection component 140 may present a list of high-scoring templates to the user or permit the user to further customize a template that is shown.

At block 507, method 500 involves placing the object on the template, thereby creating the new design document. Selection component 140 places objects from input document 200 onto template 405, thereby creating an output document as depicted in FIG. 6.

Figure 6:
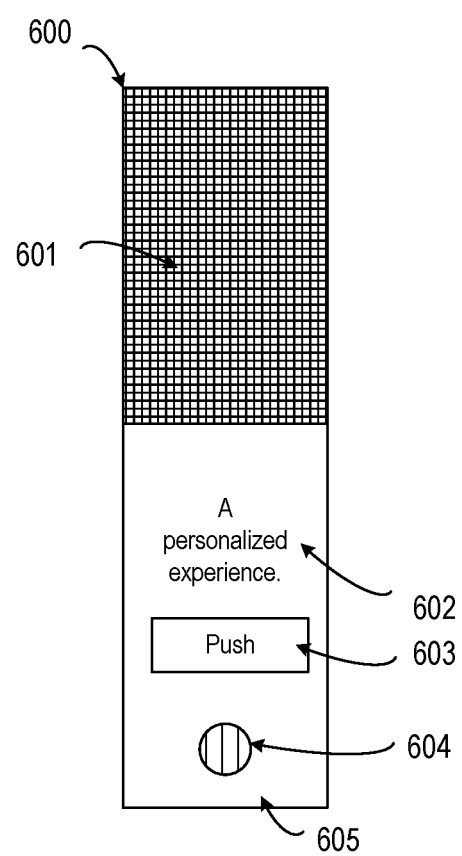
FIG. 6 depicts examples of additional layouts created by disclosed systems, according to an embodiment of the present disclosure.

FIG. 6 depicts examples of additional documents created by disclosed systems, according to an embodiment of the present disclosure. FIG. 6 depicts layout 600, which includes objects 601, 602, 603, 604, and background 605. Continuing the example, document selection component 140 places the objects 201, 202, 203, 204, and background 205 onto template objects 440, 441, 442, 443, and background object 444, thereby creating object 600. As depicted, layout 600 maintains the design aesthetic of input design document 200.

In an example, embodiments described herein can be used for generating multiple banner advertisements from an original banner advertisement design. For example, in digital advertising, designers often create design digital advertisements for multiple layouts (e.g. for different screen sizes), each having the same intent and using the same or substantially similar content. As such, creating each new design manually is cumbersome, time consuming and inefficient. Moreover, existing solutions use cumbersome-to-understand, semi-automated features.

In an example workflow, a designer wishes to create a single sized banner ad using an existing design. The existing design has four design objects and a background. The designer specifies the output size and accesses a user interface element such as a "Create Alternate Layout" button. The document processing component 120 calculates input layout parameters 128 based on the objects and their location within the design, then calculates weights 129, thereby capturing the designer's design aesthetic. In turn, the template processing component 130 accesses templates 131a-n, filters the templates based on the specified output size and applies weights 129 to the parameters of resulting templates, thereby calculating a score for each template.

Selection component 140 presents a list of high-scoring templates to the designer, who can then select a preferred layout. Selection component 140 propagates the four objects and background object to the preferred template, thereby creating a new layout. 1

Figure 7:
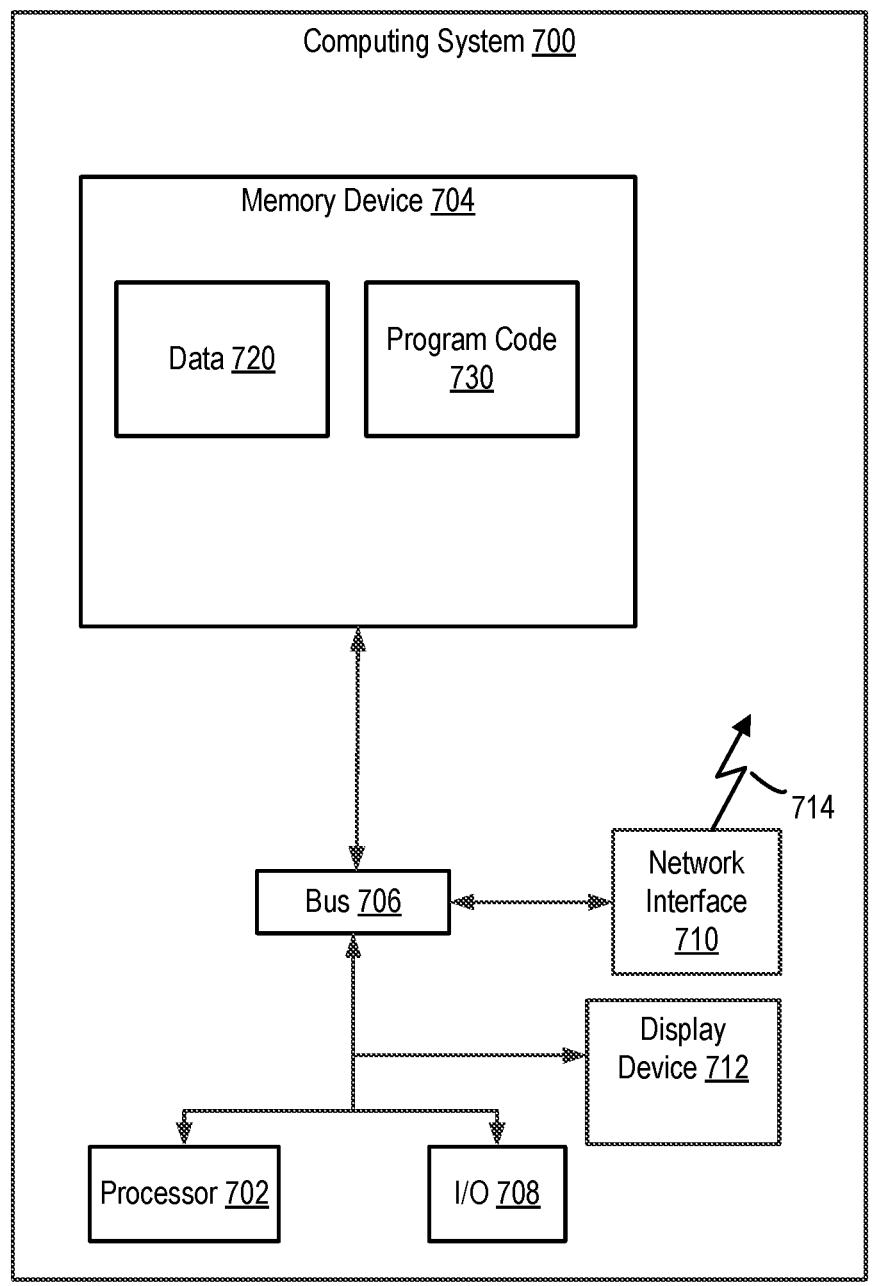
FIG. 7 depicts an example of a computing system for creating multiple documents from an input document, according to an embodiment of the present disclosure.

FIG. 7 depicts an example of a computing system for creating multiple documents from an input document, according to an embodiment of the present disclosure. Any suitable computing system may be used for performing the operations described herein. The depicted example of a computing device 700 includes a processor 702 communicatively coupled to one or more memory devices 704. The processor 702 executes computer-executable program code 730 stored in a memory device 704, accesses data 720 stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices or cores, including a single processing device. The functionality of the computing device may be implemented in hardware, software, firmware, or a combination thereof.

The memory device 704 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a flash memory, a ROM, a RAM, an ASIC, or any other medium from which a processing device can read instructions. The instructions may include processor-specific instructions generated by a compiler or an interpreter from code written in any suitable computer-programming language, including, for example, C, C++, C #, Visual Basic, Java, or scripting language.

The computing device 700 may also include a number of external or internal devices, such as input or output devices. For example, the computing device 700 is shown with one or more input/output ("I/O") interfaces 708. An I/O interface 708 can receive input from input devices or provide output to output devices. One or more busses 706 are also included in the computing device 700. The bus 706 communicatively couples one or more components of a respective one of the computing device 700.

The computing device 700 executes program code 730 that configures the processor 702 to perform one or more of the operations described herein. For example, the program code 730 causes the processor to perform the operations described in FIG. 4, 6, or 7.

The computing device 700 also includes a network interface device 710. The network interface device 710 includes any device or group of devices suitable for establishing a wired or wireless data connection to one or more data networks. The network interface device 710 may be a wireless device and have an antenna 714. The computing device 700 can communicate with one or more other computing devices implementing the computing device or other functionality via a data network using the network interface device 710.

The computing device 700 can also include a display device 712. Display device 712 can be a LCD, LED, touch-screen or other device operable to display information about the computing device 700. For example, information could include an operational status of the computing device, network status, etc.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes poses of example rather than limitation, and does not preclude the inclusion of such modifications, variations, and/or additions to the present subject matter as would be readily apparent to one of ordinary skill in the art.

The invention claimed is:

1. A method comprising:
accessing a document and an output size for generating a new design document, the document comprising an object comprising visual content and an additional object, wherein the object comprises a first object type and the additional object comprises a second object type different from the first object type;
determining, from the document, a first parameter value for a first document layout parameter from a set of document layout parameters and a second parameter value for a second document layout parameter from the set of document layout parameters;
calculating (a) a first weight for the first document layout parameter based on a contribution of the first parameter value to a sum of parameter values determined from the document and (b) a second weight for the second document layout parameter based on a contribution of the second parameter value to the sum of parameter values, wherein the sum of parameter values includes a sum of the first and second parameter values, wherein a difference between the first weight and the second weight indicates a difference in prominence between the first document layout parameter and the second document layout parameter;
determining, based on a proportion of a layout area in the document occupied by the object being greater than a proportion of the layout area in the document occupied by the additional object, a first area ordering indicating that the first object type has a higher ranking in the document the second object type;
calculating, for a template having a set of template layout parameters corresponding to the set of document layout parameters, a score based on the set of template layout parameters and a set of weights of the set of document layout parameters, including the first weight and the second weight, wherein calculating the score for the template comprises:
 computing the set of weights based on a set of parameter values determined from the document, and
 computing, using the set of weights determined from the document, a weighted sum of the set of template layout parameters for the template;
choosing the template based on the score being greater than a threshold;
identifying an additional template having the first object type and the second object type;
determining, based on a first proportion of a layout area in the additional template occupied by the second object type being greater than a second proportion of the layout area on the template occupied by the first object type, a second area ordering indicating that the second object type has a higher ranking in the additional template than the first object type;
dropping the additional template for use with the document based on the first and second area orderings indicating different rankings for the first and second object types; and
placing the object in an object container of the chosen template, thereby creating the new design document, wherein the object container corresponds with the first object type.

2. The method of claim 1, wherein the document comprises a third object of a third object type, and wherein the chosen template further comprises a third object container corresponding to the third additional object type.

3. The method of claim 1, wherein calculating the score comprises:
producing a set of weighted template layout parameters by, at least, multiplying each template layout parameter by a respective weight of a respective document layout parameter that corresponds to the template layout parameter; and
calculating a sum of the set of weighted template layout parameters.

4. The method of claim 1, wherein the document comprises a plurality of objects and the chosen template comprises a plurality of object containers;
wherein the set of document layout parameters further comprises a balance parameter representing a distribution of optical weights of the objects in the document and a density parameter representing a proportion of the document that is covered by the objects; and
wherein the set of template layout parameters further comprises a template balance parameter representing a distribution of optical weights of the object containers and a density parameter representing a proportion of the template that is covered by the object containers.

5. The method of claim 1, wherein calculating the score comprises:
identifying, for each document layout parameter, a respective weight; and
applying the respective weight of the document layout parameter to a respective template layout parameter that corresponds to the document layout parameter.

6. The method of claim 1, further comprising outputting the new design document to a user interface.

7. The method of claim 6, further comprising:
determining that changes have been made to the new design document; and
storing the changes in a predefined set of templates from which the chosen template was chosen.

8. The method of claim 1, wherein the set of document layout parameters comprises a balance parameter representing a distribution of optical weights in the document, a density parameter representing a proportion of the document that is covered by objects, and an equilibrium parameter representing a degree of stabilization, wherein computing the set of weights of the set of document layout parameters comprises:
determining parameter values for the set of document layout parameters, respectively, wherein the parameter values include the first and second parameter values;
computing the sum of parameter values by adding the parameter values; and
computing, for each determined parameter value, a respective one of the set of weights by dividing the determined parameter value by the sum of parameter values.

9. The method of claim 1, wherein the set of document layout parameters comprises an equilibrium parameter representing a degree of stabilization, wherein the equilibrium parameter is determined based on a difference between a center of mass of displayed elements on the document and a center of suspension of the document, and wherein each component of the center of mass of the displayed elements is determined based on a sum of a difference between the displayed elements and a center of a layout of the displayed elements that is weighted with an area of the layout, and a sum of areas of objects of the displayed elements weighted with a dimension of the layout.

10. A system comprising:
a non-transitory computer-readable medium storing computer-executable program instructions; and
a processing device communicatively coupled to the non-transitory computer-readable medium for executing the computer-executable program instructions, wherein executing the computer-executable program instructions configures the processing device to perform operations comprising:
 accessing a document and an output size for generating a new design document, the document comprising an object comprising visual content and an additional object, wherein the object comprises a first object type and the additional object comprises a second object type different from the first object type;
 determining, from the document, a first parameter value for a first document layout parameter from a set of document layout parameters and a second parameter value for a second document layout parameter from the set of document layout parameters;
 calculating, for each document layout parameter, (a) a first weight for the first document layout parameter based on a contribution of the first parameter value to a sum of parameter values determined from the document and (b) a second weight for the second document layout parameter based on a contribution of the second parameter value to the sum of parameter values, wherein the sum of parameter values includes a sum of the first and second parameter values, wherein a difference between the first weight and the second weight indicates a difference in prominence between the first document layout parameter and the second document layout parameter;
 determining, based on a proportion of a layout area in the document occupied by the object being greater than a proportion of the layout area in the document occupied by the additional object, a first area ordering indicating that the first object type has a higher ranking in the document the second object type;
 calculating, for a template having a set of template layout parameters corresponding to the set of document layout parameters, a score based on the set of template layout parameters and a set of weights of the set of document layout parameters, including the first weight and the second weight, wherein calculating the score for the template comprises:
  computing the set of weights based on a set of parameter values determined from the document, and
  computing, using the set of weights determined from the document, a weighted sum of the set of template layout parameters for the template;
 choosing the template based on the score being greater than a threshold;
 identifying an additional template having the first object type and the second object type;
 determining, based on a first proportion of a layout area in the additional template occupied by the second object type being greater than a second proportion of the layout area on the template occupied by the first object type, a second area ordering indicating that the second object type has a higher ranking in the additional template than the first object type;
 dropping the additional template for use with the document based on the first and second area orderings indicating different rankings for the first and second object types; and
 placing the object in an object container of the chosen template, thereby creating the new design document, wherein the object container corresponds with the first object type.

11. The system of claim 10, wherein the document comprises a third object of a third object type, and wherein the chosen template further comprises a third object container corresponding to the third object type.

12. The system of claim 10, wherein the document comprises a plurality of objects and the chosen template comprises a plurality of object containers;
 wherein the set of document layout parameters further comprises a balance parameter representing a distribution of optical weights of the objects in the document and a density parameter representing a proportion of the document that is covered by the objects; and
 wherein the set of template layout parameters further comprises a template balance parameter representing a distribution of optical weights of the object containers and a density parameter representing a proportion of the template that is covered by the object containers.

13. The system of claim 10, wherein calculating the score comprises:
 identifying, for each document layout parameter, a respective weight; and
 applying the respective weight of the document layout parameter to a respective template layout parameter that corresponds to the document layout parameter.

14. The system of claim 10, further comprising:
 determining that changes have been made to the new design document; and
 storing the changes in a predefined set of templates from which the chosen template was chosen.

15. A non-transitory computer-readable storage medium storing computer-executable program instructions, wherein when executed by a processing device, the computer-executable program instructions cause the processing device to perform operations comprising:
 accessing a document and an output size for generating a new design document, the document comprising an object comprising visual content and an additional object, wherein the object comprises a first object type and the additional object comprises a second object type different from the first object type;
 determining, from the document, a first parameter value for a first document layout parameter from a set of document layout parameters and a second parameter value for a second document layout parameter from the set of document layout parameters;
 calculating, for each document layout parameter, (a) a first weight for the first document layout parameter based on a contribution of the first parameter value to a sum of parameter values determined from the document and (b) a second weight for the second document layout parameter based on a contribution of the second parameter value to the sum of parameter values, wherein the sum of parameter values includes a sum of the first and second parameter values, wherein a difference between the first weight and the second weight indicates a difference in prominence between the first document layout parameter and the second document layout parameter;

determining, based on a proportion of a layout area in the document occupied by the object being greater than a proportion of the layout area in the document occupied by the additional object, a first area ordering indicating that the first object type has a higher ranking in the document the second object type;

calculating, for a template having a set of template layout parameters corresponding to the set of document layout parameters, a score based on the set of template layout parameters and a set of weights of the set of document layout parameters, including the first weight and the second weight, wherein calculating the score for the template comprises:

computing the set of weights based on a set of parameter values determined from the document, and computing, using the set of weights determined from the document, a weighted sum of the set of template layout parameters for the template;

choosing the template based on the score being greater than a threshold;

identifying an additional template having the first object type and the second object type;

determining, based on a first proportion of a layout area in the additional template occupied by the second object type being greater than a second proportion of the layout area on the template occupied by the first object type, a second area ordering indicating that the second object type has a higher ranking in the additional template than the first object type;

dropping the additional template for use with the document based on the first and second area orderings indicating different rankings for the first and second object types; and placing the object in an object container of the chosen template, thereby creating the new design document, wherein the object container corresponds with the first object type.

16. The non-transitory computer-readable storage medium of claim 15, wherein calculating the score comprises:

producing a set of weighted template layout parameters by, at least, multiplying each template layout parameter by a respective weight of a respective document layout parameter that corresponds to the template layout parameter; and calculating a sum of the set of weighted template layout parameters.

17. The non-transitory computer-readable storage medium of claim 15, wherein the document comprises a plurality of objects and the chosen template-comprises a plurality of object containers;

wherein the set of document layout parameters further comprises a balance parameter representing a distribution of optical weights of the objects in the document and a density parameter representing a proportion of the document that is covered by the objects; and wherein the set of template layout parameters further comprises a template balance parameter representing a distribution of optical weights of the object containers and a density parameter representing a proportion of the template that is covered by the object containers.

* * * * *